(12) United States Patent
Stober et al.

(10) Patent No.: US 11,162,544 B2
(45) Date of Patent: Nov. 2, 2021

(54) FREEWHEEL AND AUXILIARY DRIVE

(71) Applicant: Schaeffler Technologies AG & Co. KG, Herzogenaurach (DE)

(72) Inventors: Benjamin Stober, Forstfeld (FR); Philipp Rasch, Forst (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 138 days.

(21) Appl. No.: 16/493,334

(22) PCT Filed: Feb. 28, 2018

(86) PCT No.: PCT/DE2018/100174
§ 371 (c)(1),
(2) Date: Sep. 12, 2019

(87) PCT Pub. No.: WO2018/177456
PCT Pub. Date: Oct. 4, 2018

(65) Prior Publication Data
US 2021/0140495 A1    May 13, 2021

(30) Foreign Application Priority Data

Mar. 27, 2017  (DE) .......................... 102017106488.5

(51) Int. Cl.
| *F16D 41/12* | (2006.01) |
| *F16D 3/12* | (2006.01) |
| *F16H 55/36* | (2006.01) |

(52) U.S. Cl.
CPC .............. *F16D 41/12* (2013.01); *F16D 3/12* (2013.01); *F16H 55/36* (2013.01); *F16H 2055/366* (2013.01)

(58) Field of Classification Search
CPC ...... F16D 41/12; F16D 3/12; F16H 2055/366; F16H 55/36
See application file for complete search history.

(56) References Cited

U.S. PATENT DOCUMENTS

| 9,829,055 B2* | 11/2017 | Defosse ................. F16D 65/28 |
| 2002/0148697 A1* | 10/2002 | Muramatsu ............ F16D 41/12 |
| | | 192/46 |
| 2015/0060225 A1* | 3/2015 | Kimes ..................... F16D 41/14 |
| | | 192/69 |

FOREIGN PATENT DOCUMENTS

| CN | 105987096 A | 10/2016 |
| DE | 102013223882 A1 | 6/2014 |

(Continued)

*Primary Examiner* — David J Hlavka

(57) ABSTRACT

A freewheel for blocking or interrupting a torque transmission of a motor vehicle comprises a first ring configured for the input and/or output of a torque and a second ring that is arranged substantially coaxially to the first ring and configured for the output and/or input of the torque. The freewheel includes a plurality of first blocking elements, movable between a blocking position and a freewheeling position, for blocking the first ring with the second ring in a circumferential direction in the blocking position and for interrupting a torque transmission between the first ring and the second ring in the freewheeling position. A decoupler is coupled to the second ring or to the first ring for damping rotational irregularities. The decoupler has a housing, mounted on the first ring or the second ring via a housing bearing, for providing a restoring torque directed against the rotational irregularity. A brake element, which can act indirectly or directly on the second ring and/or the first ring, is provided for damping the movement of the first ring and/or the second ring. The brake element is connected indirectly or directly to the housing of the decoupler in a rotationally fixed manner.

12 Claims, 1 Drawing Sheet

(56) References Cited

FOREIGN PATENT DOCUMENTS

DE     102015204687 A1    9/2016
WO     2015014361 A2    2/2015
WO     2015021974 A1    2/2015

\* cited by examiner

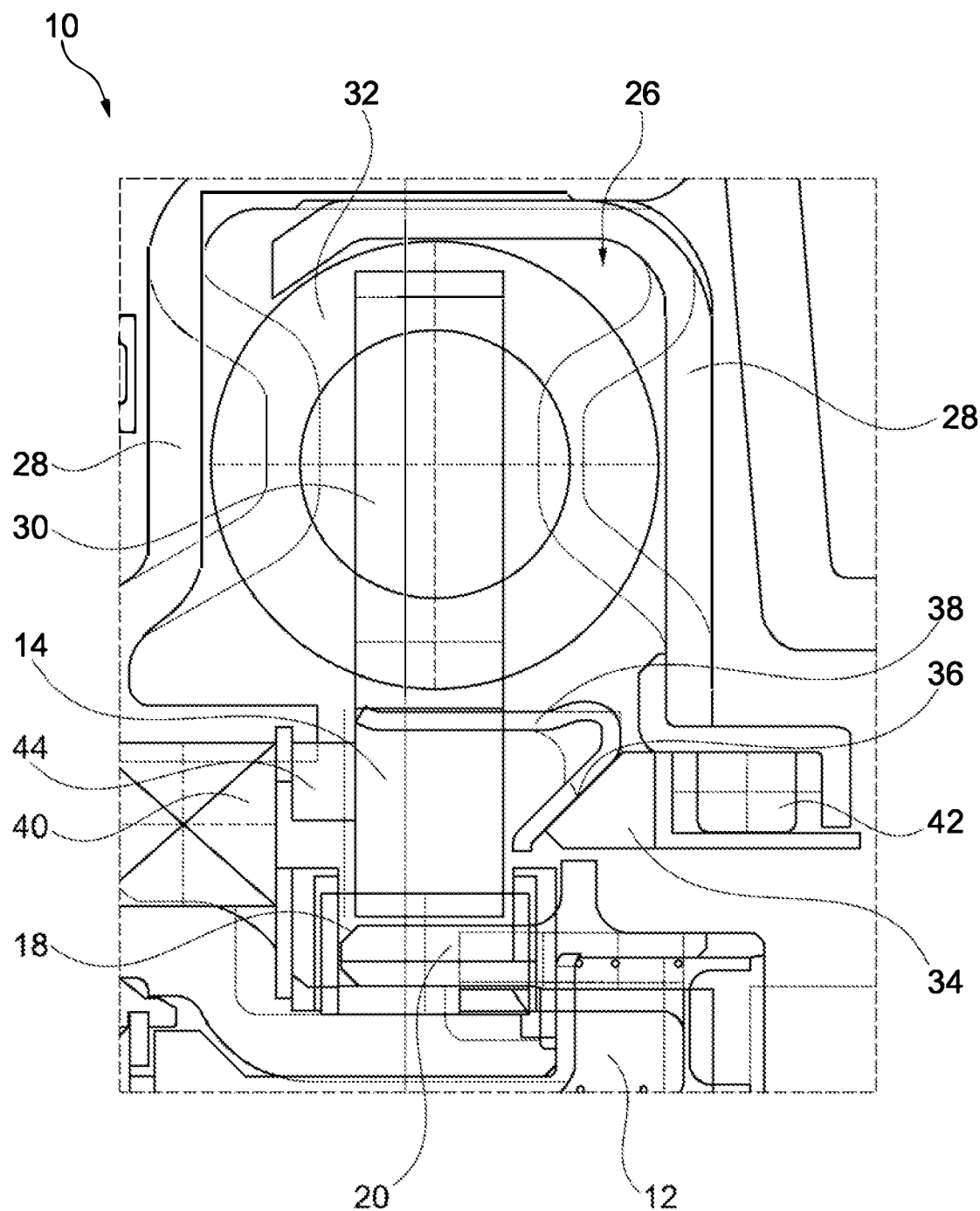

FREEWHEEL AND AUXILIARY DRIVE

CROSS-REFERENCE TO RELATED APPLICATIONS

This application is the U.S. National Phase of PCT Appln. No. PCT/DE2018/100174 filed Feb. 28, 2018, which claims priority to DE 102017106488.5 filed Mar. 27, 2017, the entire disclosures of which are incorporated by reference herein.

TECHNICAL FIELD

The present disclosure relates to a freewheel, with the aid of which a torque transmission can be optionally enabled or interrupted, for example for optionally connecting an electric machine to a drive train of a motor vehicle.

BACKGROUND

DE 10 2015 204 687 A1 discloses a two-way ratchet freewheel for optionally connecting an electric machine to a drive train of a motor vehicle, in which ratchets, pivotably coupled to an inner ring, can engage in a depression of an outer ring to couple the inner ring to the outer ring. A brake element, acting on the outer ring, is connected to the inner ring so that, in the event of a temporary change in the direction of rotation, which is undesired but essentially possible due to external torque impulses, the blocking ratchet does not lift out of the depression and impact tangentially in the depression again with high stresses and noise generation. A decoupler for damping torsional vibrations is connected to the outer ring, which decoupler has a housing, which is coupled with limited rotatability to the outer ring via a bow spring and whereof the moment of inertia, in the event of a rotational irregularity, can introduce a restoring torque directed against the rotational irregularity into the outer ring.

There is a constant need to minimize power losses in a drive train of a motor vehicle and to increase the efficiency.

SUMMARY

The object of the present disclosure is to demonstrate measures which enable an efficient drive train of a motor vehicle.

According to the present disclosure, a freewheel, in particular a two-way ratchet freewheel, for blocking or interrupting a torque transmission, in particular for optionally connecting an electric machine to a drive train of a motor vehicle, is provided with a first ring, in particular configured as an inner ring, for input and/or output of a torque, a second ring, arranged substantially coaxially to the first ring and configured in particular as an outer ring, for output and/or input of the torque, a plurality of first blocking elements, movable, in particular pivotable, between a blocking position and a freewheeling position, for blocking the first ring with the second ring in a first circumferential direction in the blocking position and for interrupting a torque transmission between the first ring and the second ring in the freewheeling position, a decoupler, coupled to the second ring or to the first ring, for damping rotational irregularities, wherein the decoupler has a housing, mounted on the first ring or the second ring via a housing bearing, for providing a restoring torque directed against the rotational irregularity, and a brake element, which can act indirectly or directly on the second ring and/or the first ring, for damping the movement of the first ring and/or the second ring, wherein the brake element is connected indirectly or directly to the housing of the decoupler in a rotationally fixed manner.

As a result of the radial play between the first ring and the second ring, which is unavoidable owing to manufacturing tolerances and is possibly provided intentionally for easier assembly, it is easily possible for the first blocking element to lift away from the ring which is rotatable relative to the first blocking element when a change in the direction of rotation of the first ring with respect to the second ring occurs and/or only a slight torque, if any, is applied. For example, if a motor vehicle engine is switched off, a torque flow via the freewheel provided in the drive train, for example for connecting a belt pulley provided for driving auxiliary units to an engine shaft of the motor vehicle engine, does not take place. In this case, it is, however, possible that a temporary change in the direction of rotation in the freewheel may occur. These changes in direction can lead to the ring which is rotatable relative to the first blocking element lifting away from the first blocking element and subsequently being able to impact against the first blocking element and/or against a second blocking element acting in the opposite circumferential direction, whereby unnecessary component stresses and noise emissions caused by impact noises can be generated. These external force influences leading to a temporary change in direction in the freewheel can be caused, for example, by rotational irregularities of the motor vehicle engine, for example when the load-carrying capacity of an auxiliary unit coupled to the motor vehicle engine alters. In this regard, for example, a starter generator which can be coupled to the motor vehicle engine can alter its operating state between engine mode, generator mode or a substantially load-free co-rotation and thereby cause suddenly occurring irregularities in the torque and in the rotational speed of the drive shaft of the motor vehicle engine. However, as a result of the brake element, a free relative rotation of the first ring with respect to the second ring, and therefore a free relative rotation of the first blocking element with respect to the ring which is rotatable relative to the first blocking element, can be prevented and the relative rotation at least slightly hindered. A relative rotation takes place in a damped manner owing to the brake element acting with friction fit so that temporary changes in the direction of rotation can be filtered out by the brake element. A noisy back and forth rotation, which would be linked to the relatively rotatable ring impacting against the first blocking element, in the event of a substantially load-free state of the freewheel as a result of external force influences can thus be prevented or at least hindered. An intentional change in the direction of rotation in regular operation of the freewheel is, however, not impaired by the brake element since the brake element substantially compensates or absorbs only slight torques whilst, in regular operation of the motor vehicle engine, substantially higher torques are essentially introduced into the freewheel, which can bring about a relative rotation of the first ring with respect to the second ring without significant power losses as a result of the brake element.

Since the brake element does not act on both the first ring and the second ring, it is possible to prevent friction applied by the brake element in freewheeling mode if all blocking elements are located in the freewheeling position and the first ring can rotate freely with respect to the second ring. If, in the blocking position, a sudden torque impulse occurs, which leads to a sudden temporary change in the direction of rotation, the housing of the decoupler will also execute a relative rotation owing to its inertia, so that sufficient friction can be produced by the brake element so that the blocking ratchet does not lift out of a depression and impact tangentially in the depression again with high stresses and noise generation. In freewheeling mode, the brake element can co-rotate with the decoupler and the associated ring coupled to the decoupler, so that a friction force is not exerted on the other ring by the brake element. For example, an auxiliary unit, in particular a climate control compressor for a climate control system of the motor vehicle, and a generator, in particular a starter generator for starting a motor vehicle engine connected via the other ring, can be coupled via the housing of the decoupler, which is configured in particular as a belt pulley. If the freewheel is shifted to freewheeling mode when the motor vehicle engine is switched off, the generator can operate the auxiliary unit without the brake element causing unnecessary friction in the freewheel. This makes use of the knowledge that sudden inadvertent torque impulses do not generally occur in a stationary vehicle and in purely electric mode, which means that a relative rotation in the decoupler which is subject to friction as a result of the brake element need not be feared. For example, in standard climate control mode, if the generator is operating the climate control compressor when the motor vehicle engine is switched off, friction losses, which lead to reduced efficiency of the drive train, are prevented. Also in the case of a hybrid motor vehicle, friction losses in the freewheel can be prevented in purely electrical mode when the motor vehicle engine is uncoupled. This increase in efficiency is particularly high in a hybrid motor vehicle with a range extender since, in this case, the purely electric mode is particularly long. An efficient drive train of a motor vehicle is enabled by preventing a frictional coupling of the first ring to the second ring via the brake element in the freewheeling mode of the freewheel.

The first ring can be configured as an inner ring, whilst the second ring is configured as an outer ring. Alternatively, the first ring can be configured as an outer ring whilst the second ring is configured as an inner ring. In particular, the plurality of first blocking elements are arranged in a uniform distribution in the circumferential direction. The first ring and/or the second ring has, in particular, a blocking depression into which the first blocking element, in particular of a shifting ring and/or a spring element, can be pressed into the blocking position in order to transmit a torque between the first ring and the second ring. In the blocking position, the first blocking element can be clamped between the first ring and the second ring, in particular with form fit. The freewheel can moreover be designed and developed in particular as described in DE 10 2015 204 687 A1, the content of which is referred to herein as part of the present disclosure.

The freewheel can be provided in particular in a belt pulley coupled to a drive shaft of a motor vehicle engine, in particular for driving motor vehicle auxiliary units and/or for connecting a starter, preferably in the form of a starter generator for starting the motor vehicle engine, in order to couple the belt pulley to the drive shaft via the freewheel. In particular an electric machine can be coupled to a drive train of a motor vehicle via the belt pulley. The freewheel can be configured in particular as a one-way shiftable freewheel or a two-way shiftable freewheel. The freewheel can be configured for example as a ratchet freewheel, clamping body freewheel or roller freewheel. To this end, the first blocking element can be configured in particular as a pivotably mounted blocking ratchet, which can preferably be pivoted into a blocking depression in the blocking position. The first blocking element can also be configured as a clamping body, which can be tiltably mounted for example in a cage and can be tilted by a shifting ring into a clamping position, which is, in particular, self-reinforcing during the torque transmission, in the blocking position. The first blocking element can also be configured as a rolling body, for example a cylinder or ball, which can be displaced by a shifting ring in the circumferential direction along an inclined plane into a clamping position, which is, in particular, self-reinforcing during the torque transmission, in the blocking position. Depending on the configuration of the first blocking element, the first blocking element can execute a pivotal movement, a displacement in the radial direction and/or a displacement in the circumferential direction during the movement between the freewheeling position and the blocking position. If the second ring overruns the first ring, a torque transmission from the second ring to the first ring can take place in the first circumferential direction in the blocked state of the freewheel. If the first ring overruns the second ring, a torque transmission from the first ring to the second ring in a second circumferential direction contrary to the first circumferential can take place in the blocked state of the freewheel. In particular, a shifting ring for moving the first blocking element between the freewheeling position and the blocking position is provided. The shifting ring can be actuated for example with the aid of an actuator, preferably against the spring force of a restoring spring. The restoring spring can move the shifting ring back into a defined starting position when the actuating force of the actuator decreases. Second blocking elements for transmitting a torque in a circumferential direction contrary to the transmission direction of the first blocking elements are preferably provided, wherein the second blocking elements can be moved between the blocking position and the freewheeling position in particular by a second shifting ring or the shifting ring provided for the first blocking elements. The second blocking elements are configured in particular analogously, in particular mirror-symmetrically, to the first blocking elements.

In particular, the brake element has a centering chamfer for centering the second ring or the first ring on the housing. The brake element therefore acts not only as a brake but also as a centering element. It is thus possible, in particular, to compensate a radial tolerance which arises as a result of a comparatively long tolerance chain and/or is provided intentionally for facilitating assembly. In this case, the one ring can be centered on the housing with the aid of the centering chamfer of the brake element and the housing can in turn be centered on the other ring via the housing bearing.

The first ring is preferably centered on the second ring indirectly via the housing bearing, the housing and the brake element. The centering of the first ring with respect to the second ring therefore takes place indirectly via the housing and the housing bearing, rather than directly. A frictional relative rotation of the first ring with respect to the second ring via the brake element in freewheeling mode is thus prevented.

It is particularly preferably provided that the housing of the decoupler is mounted on the first ring, the brake element acts on the second ring and the decoupler is configured for introducing the restoring torque into the second ring, or the housing of the decoupler is mounted on the second ring, the brake element acts on the first ring and the decoupler is configured for introducing the restoring torque into the first ring. A separation of the decoupler together with the brake element and the one ring from the other ring can thus take place in freewheeling mode so that, in freewheeling mode, the component having the one rotational speed is only mounted via the housing bearing with the other component having the other rotational speed. A frictional grinding contact of the component having the first ring with the component having the second ring is thus reliably prevented.

In particular, the first ring and/or the second ring is arranged in the axial direction between the housing bearing and the brake element. The freewheel can be designed to be substantially closed on the axial side with the housing bearing, so that, on the other axial side, sufficient installation space can be left free to enable the brake element or further components, for example a shifting ring for shifting the blocking elements, to be provided opposite the housing bearing.

A supporting element for limiting an axial offset of the second ring acted upon axially by the brake element or the first ring acted upon axially by the brake element is preferably provided, wherein in particular the second ring and/or the first ring is arranged in the axial direction between the supporting element and the brake element. The brake element can apply a force with at least one component in the axial direction. The ring acted upon by an axial force from the brake element can move towards the supporting element in the axial direction so that the axial relative position of the first ring and/or the second ring can be predetermined by the supporting element. The supporting element can moreover be provided between the housing bearing and the first ring and/or the second ring, so that the housing bearing is protected from the first ring and/or the second ring. As seen in the axial direction, the supporting element can preferably cover the housing bearing at least partially, for the most part or completely.

The brake element is particularly preferably designed to be shiftable between a braking position, in which the brake element acts indirectly or directly on the first ring and/or on the second ring, and a release position, in which the brake element is uncoupled from the first ring and from the second ring. The brake element can be designed to be displaceable in the axial direction, for example, and can be displaced between the braking position and the release position by an actuator, possibly against a spring force of a pre-tensioning spring. In certain operating situations, this enables a braking effect of the brake element to be switched off and/or switched on intentionally. Furthermore, the movability of the brake element enables wear-induced abrasion of the brake element to be regulated.

In particular, the brake element acts indirectly or directly either on only the second ring or on only the first ring. Simultaneous frictional contact on both the first ring and the second ring is thus prevented. A bridging of the housing bearing by the brake element is thus prevented. Unnecessary friction losses in the freewheeling mode of the freewheel are prevented.

A shifting element, rotatable in the circumferential direction, for shifting at least one blocking element is preferably provided in the radial direction between the first ring and the second ring. On the axial side facing away from the housing bearing, the shifting element, configured for example as a shifting ring, can engage in a clearance between the first ring and the second ring in the axial direction and, as a result of a relative rotation, pivot the first blocking elements and/or the second blocking elements between the blocking position and the freewheeling position. A respective shifting element is preferably provided for the first blocking elements, on the one hand, and for the possibly provided second blocking elements on the other, wherein the shifting elements can be actuated in particular independently of one another. The freewheel can thus be actively shifted so that a purely centrifugally induced shifting of the freewheel is not required. The freewheel can thus be shifted appropriately for a certain operating situation of the drive train so that many operating strategies can be implemented accordingly.

The present disclosure furthermore relates to an auxiliary drive for driving auxiliary units of a motor vehicle, having a freewheel, which can be designed and developed as described above, for coupling an auxiliary unit to a drive train of the motor vehicle, a generator coupled to the housing of the decoupler, in particular a starter generator for starting a motor vehicle engine, and an auxiliary unit, in particular a climate control compressor, coupled to the housing of the decoupler and to the generator. An efficient drive train of a motor vehicle is enabled by preventing a frictional coupling of the first ring to the second ring via the brake element in the freewheeling mode of the freewheel of the auxiliary drive. With the aid of a belt starter generator (BSG) connected to the housing, in particular via a belt, a climate control compressor of a climate control system, which is likewise connected to the belt, can be driven in stationary climate control mode when the housing, configured as a belt pulley, is uncoupled from a drive shaft of the switched-off motor vehicle engine. The auxiliary drive can be designed and developed and operated as described, in particular, in WO 2015/014361 A2, the content of which is referred to herein as part of the present disclosure.

BRIEF DESCRIPTION OF THE DRAWINGS

The present disclosure is explained by way of example below, with reference to the accompanying drawing, wherein the features illustrated below can represent an aspect of the present disclosure both individually and in combination. The drawing shows:

The single FIGURE illustrating a schematic sectional view of a freewheel.

DETAILED DESCRIPTION

The freewheel 10, illustrated in the FIGURE and configured as a two-way ratchet freewheel, has a first ring 12, configured as an inner ring, and a relatively rotatable second ring 14, arranged coaxially to the inner ring 12 and configured as an outer ring. The inner ring 12 has a plurality of depressions configured as receiving pockets, in which a first blocking element 18, configured as a blocking ratchet, is pivotably inserted in each case so that the first blocking element 18 can be pivoted between the illustrated blocking position, in which the first blocking element 18 engages in the depression of the outer ring 14 during a relative movement in a first circumferential direction, and a freewheeling position, in which the first blocking element 18 is pressed out of the depression of the outer ring 14 against the spring force of a supporting spring during a relative movement in a second circumferential direction contrary to the first circumferential direction. In the radial direction, a shifting element 20, configured as a shifting ring, can engage between the first ring 12 and the second ring 14, which shifting ring can be rotated relative to the first ring 12, on which the first blocking elements 18 are pivotably mounted, in order to pivot the the first blocking elements 18 between the blocking position and the freewheeling position. By mounting the first blocking elements 18 on the first ring 12, the first ring 12 is configured to co-rotate with the first blocking elements 18, whilst the second ring 14 is configured to be rotatable relative to the first blocking elements 18. In the illustrated exemplary embodiment, a second blocking element can be additionally provided, which can be pivoted between a blocking position, in which the second blocking element engages in the depression of the outer ring 14 during a relative rotation in the second circumferential direction, and the freewheeling position, in which the second blocking element is pressed out of the depression of the outer ring 14 against the spring force of the supporting spring during a relative movement in the first circumferential direction.

The freewheel 10 furthermore has a decoupler 26, with the aid of which rotational-speed fluctuations in the torque to be introduced can be damped. To this end, the decoupler 26 has a two-part housing 28 for the input of the torque, a flange-like output element 30, connected to the outer ring 14, for the output of the torque to the outer ring 14 and an energy storage element 32, which can be coupled to the housing 28 and the output element 30 and is configured as a bow spring. The housing 28 can provide in particular a significant inertia to enable rotational-speed fluctuations to be damped or eliminated in a defined frequency range.

The freewheel 10 has a substantially conical brake element 34, which can interact with a friction surface 36 on the second ring 14 and which simultaneously fulfills a centering function for the second ring 14 on the housing 28. To this end, the second ring 14 has a fixedly connected friction plate 38, which can abut with planar contact against the friction surface 36 of the brake element 34 as friction partners. The brake element 34 is connected in a rotationally fixed manner to the housing 28, which is mounted and centered on the inner ring 12 via a housing bearing 40. The brake element 34 can be designed to be movable in the axial direction with the aid of a pre-tensioning spring and/or an actuator 42. An axial relative position of the second ring 14 can be predetermined by a supporting element 44, which is connected to the housing 28 and towards which the second ring 14 can move axially.

LIST OF REFERENCE SIGNS

10 Freewheel
12 First ring
14 Second ring
18 First blocking element
20 Shifting element
26 Decoupler
28 Housing
30 Output element
32 Energy storage element
34 Brake element
36 Friction surface
38 Friction plate
40 Housing bearing
42 Actuator
44 Supporting element

The invention claimed is:

1. A freewheel for blocking or interrupting a torque transmission of a motor vehicle, comprising:
   a first ring configured for an input and/or an output of a torque,
   a second ring, arranged substantially coaxially to the first ring, configured for the output and/or input of the torque,
   a plurality of first blocking elements, movable between a blocking position and a freewheeling position, for blocking the first ring with the second ring in a circumferential direction in the blocking position and for interrupting a torque transmission between the first ring and the second ring in the freewheeling position,
   a decoupler, coupled to the second ring or to the first ring, for damping rotational irregularities, wherein the decoupler has a housing, mounted on the first ring or the second ring via a housing bearing, for providing a restoring torque directed against the rotational irregularity, and
   a brake element, which can act indirectly or directly on the second ring and/or the first ring, for damping a movement of the first ring and/or the second ring,
   wherein the brake element is connected indirectly or directly to the housing of the decoupler in a rotationally fixed manner, and
   wherein the housing of the decoupler is mounted on the first ring, the brake element acts on the second ring and the decoupler is configured for introducing the restoring torque into the second ring, or the housing of the decoupler is mounted on the second ring, the brake element acts on the first ring and the decoupler is configured for introducing the restoring torque into the first ring.

2. The freewheel as claimed in claim 1, wherein the brake element has a centering chamfer for centering the second ring or the first ring on the housing.

3. The freewheel as claimed in claim 1, wherein the first ring is centered on the second ring indirectly via the housing bearing, the housing and the brake element.

4. The freewheel as claimed in claim 1, wherein the first ring and/or the second ring is arranged in an axial direction between the housing bearing and the brake element.

5. The freewheel as claimed in claim 1, wherein a supporting element for limiting an axial offset of the second ring acted upon axially by the brake element or the first ring acted upon axially by the brake element is provided, wherein the second ring and/or the first ring is arranged in the axial direction between the supporting element and the brake element.

6. The freewheel as claimed in claim 1, wherein the brake element is designed to be shiftable between a braking position, in which the brake element acts indirectly or directly on the first ring and/or on the second ring, and a release position, in which the brake element is uncoupled from the first ring and from the second ring.

7. The freewheel as claimed in claim 6, wherein the brake element acts indirectly or directly either on only the second ring or on only the first ring.

8. The freewheel as claimed in claim 1, wherein a shifting element, rotatable in the circumferential direction, for shifting at least one blocking element is provided in a radial direction between the first ring and the second ring.

9. An auxiliary drive for driving auxiliary units of a motor vehicle, comprising a freewheel as claimed in claim 1 for coupling an auxiliary unit to a drive train of the motor vehicle, a generator coupled to the housing of the decoupler, and an auxiliary unit, coupled to the housing of the decoupler and to the generator.

10. The auxiliary drive of claim 9, wherein the generator is a starter generator for starting a motor vehicle engine.

11. The auxiliary drive of claim 9, wherein the auxiliary unit is a climate control compressor.

12. The freewheel of claim 1, wherein the first ring is configured as an inner ring and the second ring is configured as an outer ring.

* * * * *